May 26, 1942.  R. D. PARROTT ET AL  2,283,944
APPARATUS FOR FACSIMILE TELEGRAPHY
Filed Aug. 28, 1937   7 Sheets-Sheet 1

INVENTORS
R.D. PARROTT
G.L. ERICKSON
R.J. WISE
BY George T Craig
ATTORNEY

May 26, 1942.  R. D. PARROTT ET AL  2,283,944
APPARATUS FOR FACSIMILE TELEGRAPHY
Filed Aug. 28, 1937  7 Sheets-Sheet 2
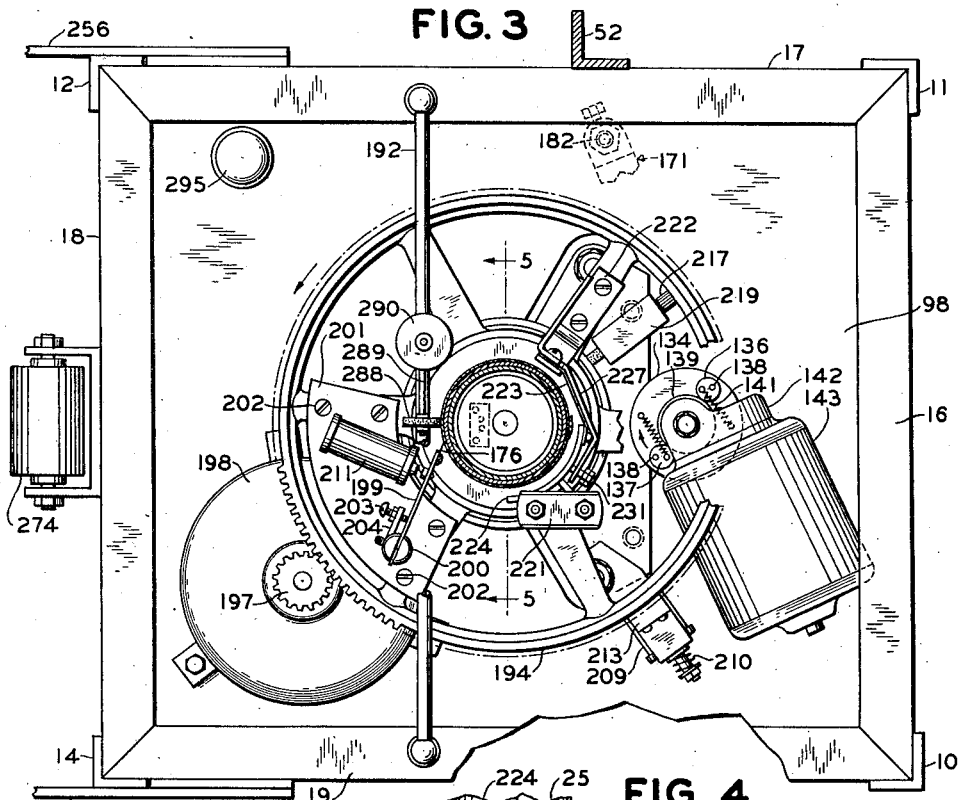
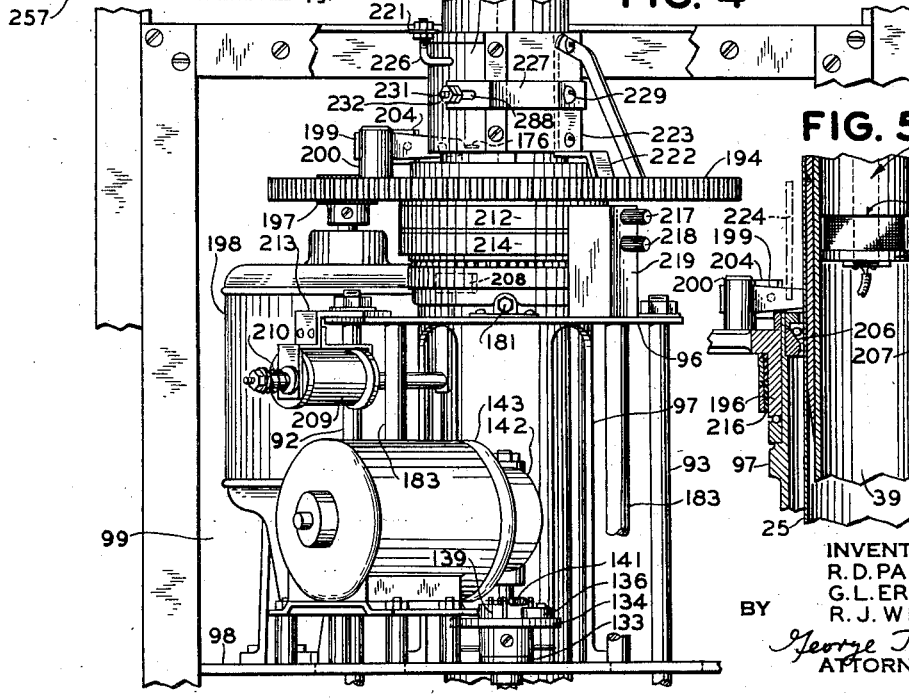
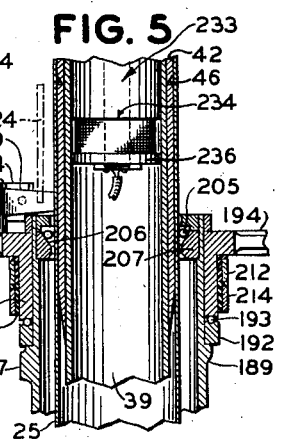
INVENTORS
R. D. PARROTT
G. L. ERICKSON
R. J. WISE
BY George T Craig
ATTORNEY May 26, 1942.    R. D. PARROTT ET AL    2,283,944
APPARATUS FOR FACSIMILE TELEGRAPHY
Filed Aug. 28, 1937    7 Sheets-Sheet 3

INVENTORS
R.D. PARROTT
G.L. ERICKSON
R.J. WISE
BY George J. Craig
ATTORNEY

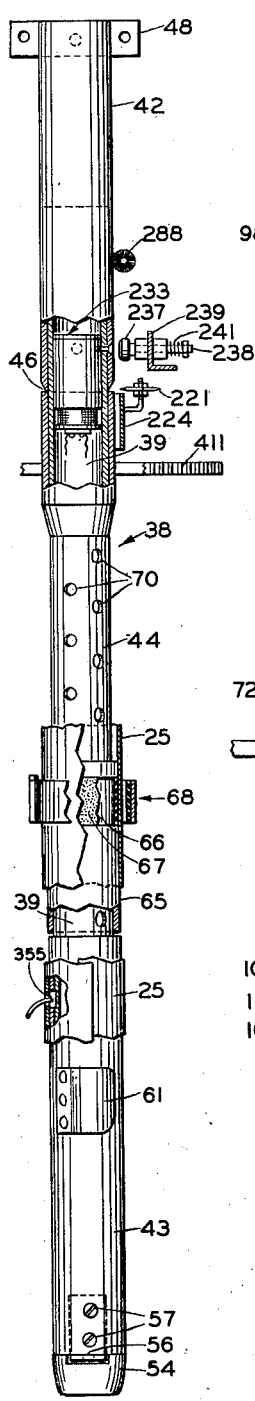
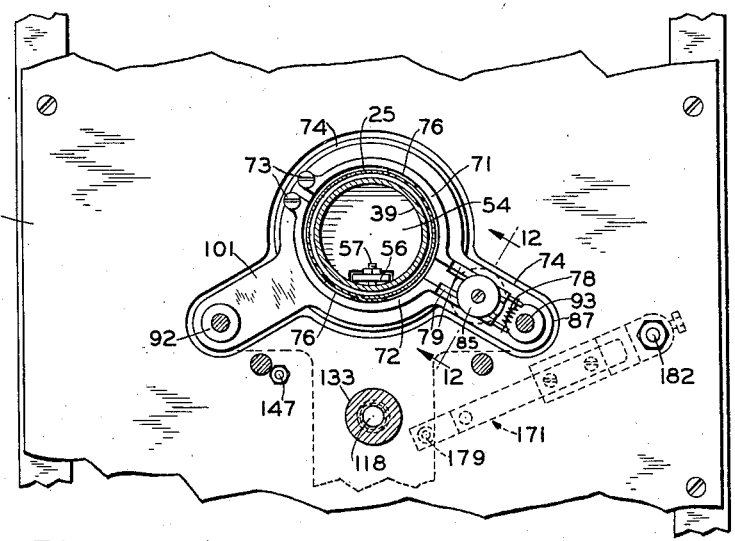
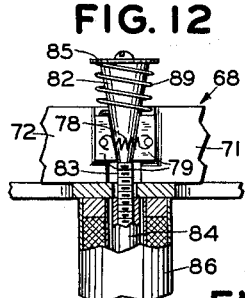
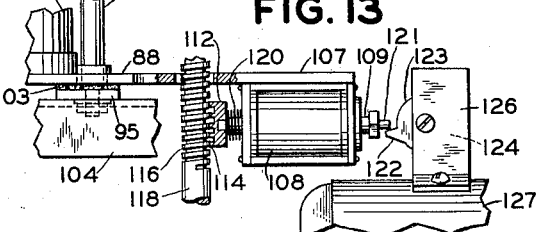
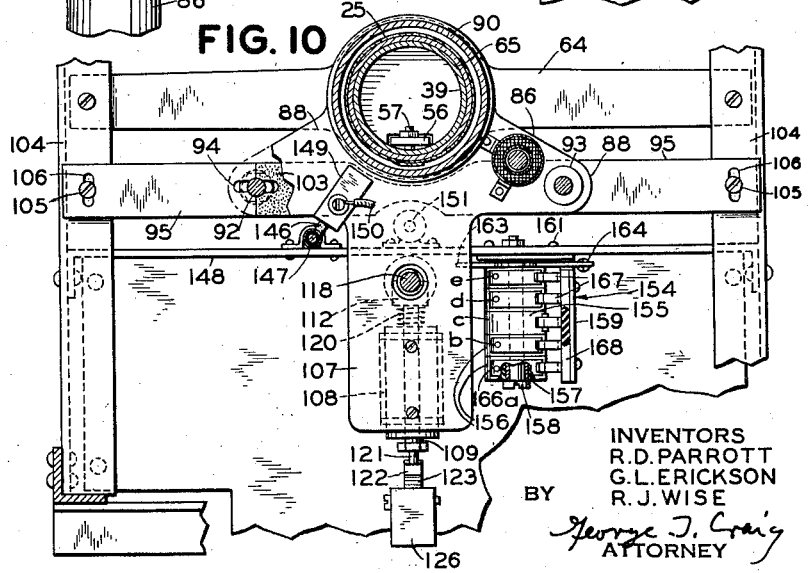

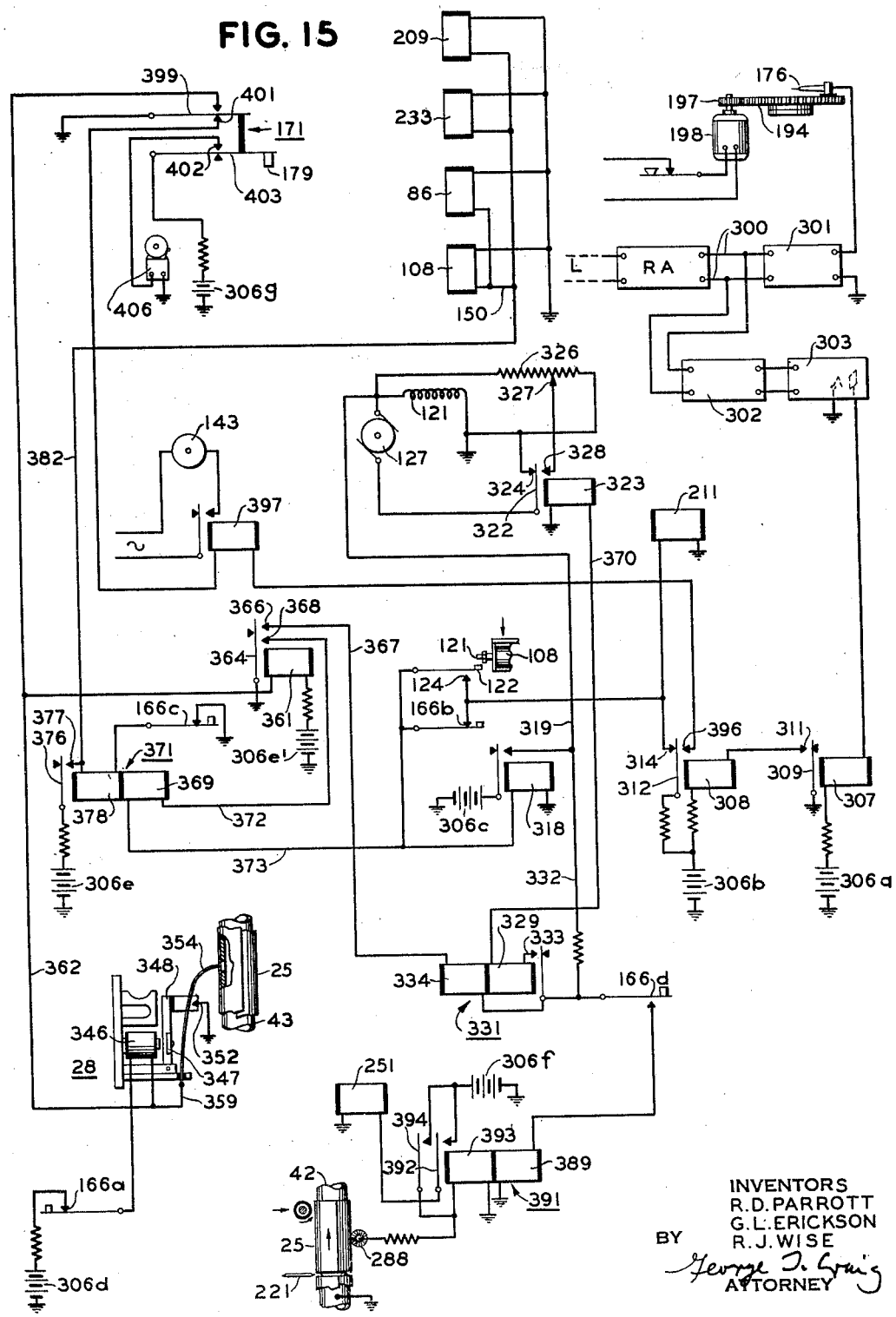

INVENTORS
R. D. PARROTT
G. L. ERICKSON
R. J. WISE
BY George J. Craig
ATTORNEY

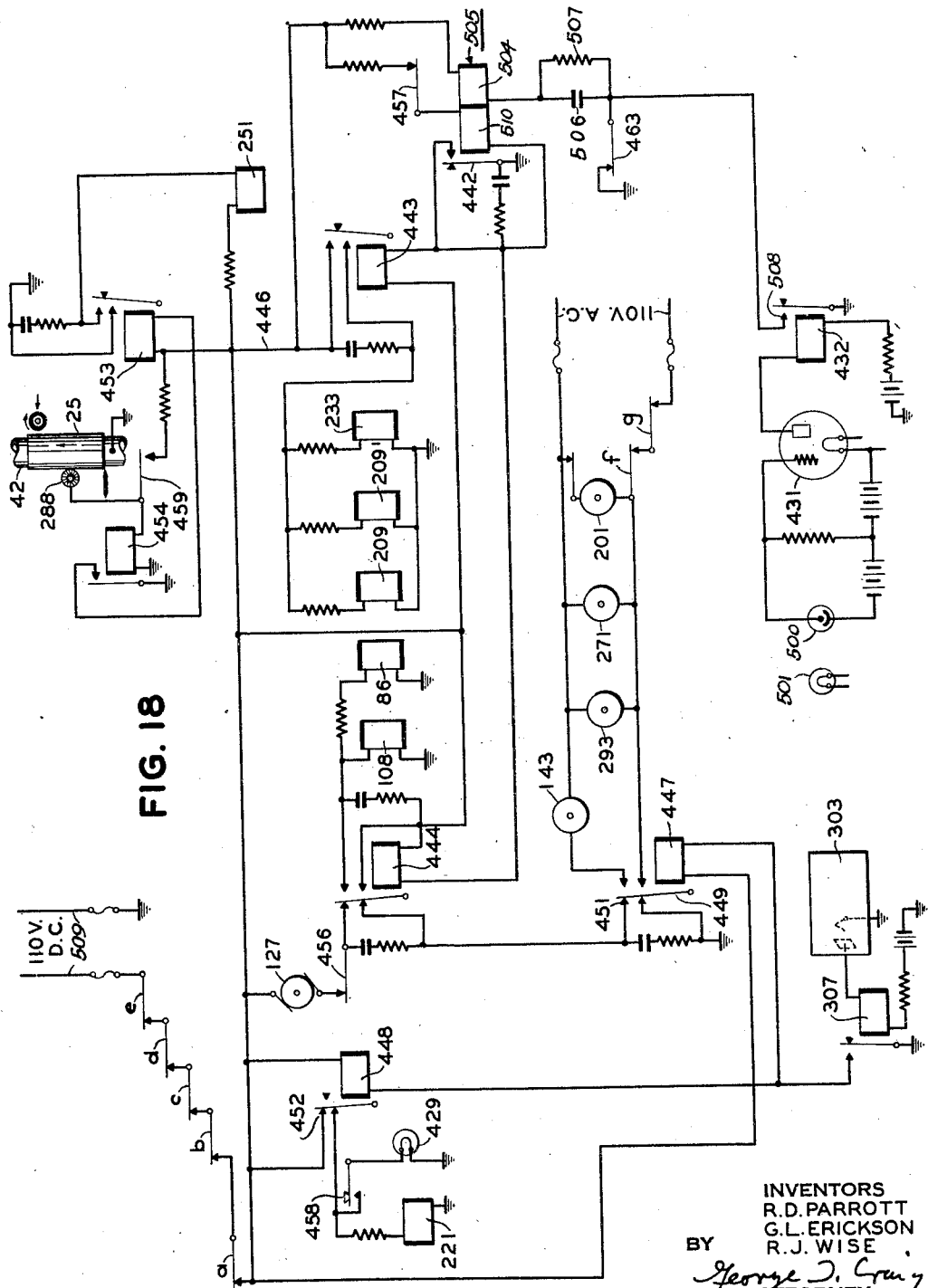

Patented May 26, 1942

2,283,944

UNITED STATES PATENT OFFICE 2,283,944

APPARATUS FOR FACSIMILE TELEGRAPHY

Robert D. Parrott, West New York, George L. Erickson, Hasbrouck Heights, and Raleigh J. Wise, Dunellen, N. J., assignors to The Western Union Telegraph Company, New York, N. Y., a corporation of New York Application August 28, 1937, Serial No. 161,358

26 Claims. (Cl. 178—14)

This invention relates to telegraphy and more particularly to automatic facsimile telegraph apparatus of novel type and control systems therefor.

The primary object of this invention is to provide a novel telegraph or facsimile machine capable of operation under control of signals originating at a more or less distant point.

The present invention has for another object to provide apparatus in which a continuous sheet or web is fed at a desired speed so as to cooperate with an electrical scanning device during the operating period of said device, following which the sheet or web is fed at a faster speed until a predetermined total length of the sheet has been fed. In this manner the sheet, which may be provided at spaced intervals if desired with headings or other subject matter, is fed intermittently a definite length at a time. In the illustrative embodiment, equal lengths of the web are fed successively but it is within the scope of the invention to feed definite lengths of web which are not equal to each other. In the event that a machine embodying the present invention is to be used to record pictures, messages or other subject matter, a further important object of the invention is to provide an automatically operated cut-off device and a conveyor for the severed sheets.

Still another object of the invention is to provide a facsimile telegraph machine which will scan a sheet automatically and in which said sheet is moved continuously for a definite distance at all times regardless of the period of operation of the scanning device.

A still further object of the present invention is to provide novel means for seizing and propelling a continuous sheet or web at a plurality of different speeds.

A still further object of the present invention is to provide a novel sheet severing device for severing sheets from a continuous strip in register with subject matter spaced at definite intervals on said strip or web.

A still further object of the present invention is to provide novel means for changing the speed of travel of a sheet or web in a facsimile telegraph machine upon completion of a scanning operation.

The foregoing and other and more detailed objects of the invention will appear from the following description of an illustrative embodiment of the invention.

In the drawings:

Fig. 3 is an enlarged top plan view taken in section on line 3—3 of Fig. 1;

Fig. 4 is an enlarged fragmentary side elevation as seen from the opposite side of Fig. 1;

Fig. 5 is an enlarged fragmentary section taken on line 5—5 of Fig. 3 as viewed in the direction of the arrows;

Fig. 9 is a fragmentary plan view sectioned on line 9—9 of Fig. 6;

Fig. 10 is a fragmentary plan view in section on line 10—10 of Fig. 6;

Fig. 11 is an enlarged view in elevation of certain parts of the mechanism of Fig. 1;

Fig. 12 is a fragmentary view in section taken on line 12—12 of Fig. 9;

Fig. 13 is a fragmentary detail view of parts of the machine taken partly in section on line 13—13 of Fig. 6;

Fig. 15 illustrates diagrammatically the electrical features of a control system in accordance with the invention;

Fig. 18 illustrates diagrammatically the electrical features of a modified control system in accordance with the invention.

Figure 2:
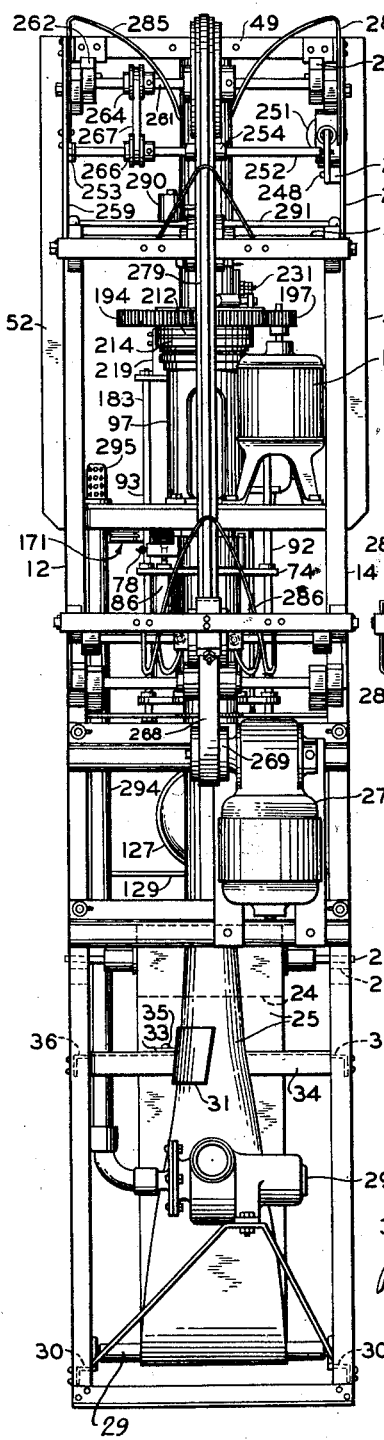
Fig. 2 is a rear elevation of the machine as viewed from the left hand side of Fig. 1.

The illustrative machine shown in the drawings is primarily intended for the reception in facsimile of messages or other subject matter and in the description which is to follow the machine will be described as an automatic receiver. However, it will be understood that but slight modification is required to have the machine function as a transmitter of successive pieces of subject matter carried by or upon a continuous web. For transmission, no change need be made in the web feeding mechanism or the locally operated control arrangement, and the scanning device may be used for transmitting by the method disclosed in the application of R. J. Wise, Ser. No. 23,926, filed May 28, 1935, now Patent No. 2,153,858, issued April 11, 1939 in conjunction with suitable amplifiers and line terminal connections.

Figure 1:
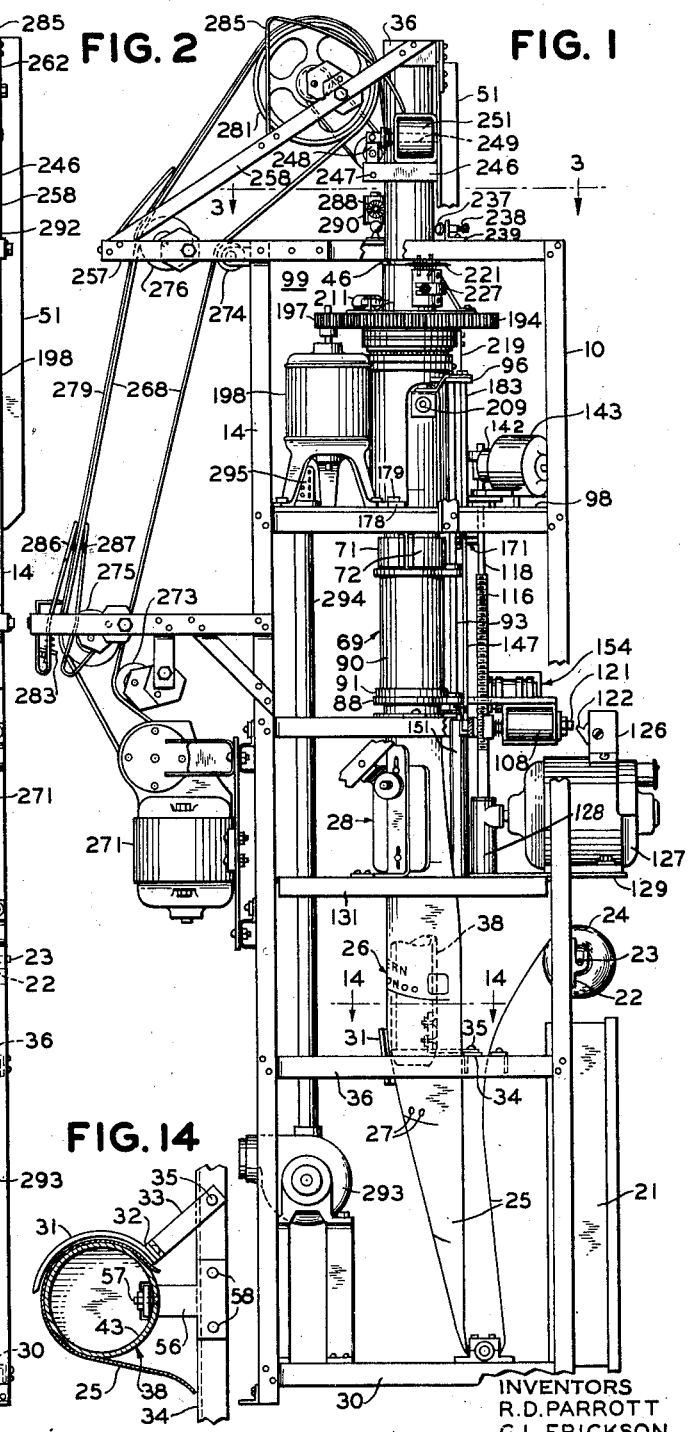
Fig. 1 is a view in side elevation of a facsimile machine embodying the invention in a preferred form.

Referring to the drawings and particularly to Figs. 1 and 2 thereof which illustrate a complete machine embodying the invention, the supporting frame upon which the machine is constructed is composed of upright members 10, 11, 12 and 14 which are connected at their tops by a rectangular frame composed of frame members 16, 17, 18 and 19, the latter being shown in their relative positions by Fig. 3 of the drawings. The upright members 10 and 11 carry a cabinet 21 which is provided to conveniently house the electrical apparatus for controlling the machine.

The upright members 10 and 11 are each provided with a bracket 22, one of which appears in Fig. 1 of the drawings, and these brackets are notched as shown or otherwise appropriately formed to receive and rotatably support a pintle 23 which carries a storage roll 24 of paper from which the web 25 is fed. If the machine is to be used as a recorder, the roll 24 will be suitably prepared recording paper. In the preferred form of the invention, the strip or web of recording paper is provided at intervals with printed matter 26 forming the headings of blanks which are severed in a manner to be described. Accurate register of the headings 26, when the scanned blanks are severed, is insured by perforations 27 which cooperate with a device indicated generally by numeral 28 as the web is advanced. Details and operation of the device 28 will be fully disclosed hereinafter in connection with the description of the electrical features of the control system shown on Fig. 11 of the drawings.

Figure 14:
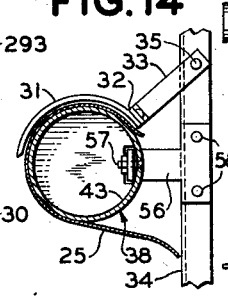
Fig. 14 is a fragmentary plan view in section taken on line 14—14 of Fig. 1.

The paper web 25 which is fed from the storage roll 24 passes downwardly and under an idler roll 29 rotatably supported on the spaced lateral frame members 30. The idler roll permits location of the storage roll of paper in an accessible place as shown and also maintains the entering web in a constant position with respect to the web feeding mechanism, now to be described, regardless of the size of the storage roll and its diminution in operation. The web 25 as it leaves the idler roll 29 and proceeds upwardly is curved initially in a transverse direction by an arcuate guide member 31 (Fig. 14) which has a substantially rigid edge member 32 to which is secured a bracket member 33, the latter being in turn secured to a transverse member 34 by suitable fastening means 35. The transverse means 34 is carried by a pair of angle bars 36 disposed at opposite sides of the machine. The arcuate guide member 31 is preferably formed from flexible material such as rubber and may be conveniently made by cutting a piece of rubber tubing. It is sufficiently rigid so that it brings the paper to a curved form at one edge as illustrated in Fig. 14 of the drawings. The paper web 25, curved initially by the member 31, is fed over a tubular assembly 38, details of which are shown separately in Fig. 11 of the drawings to which reference will now be had.

The stationary parts of the tubular assembly comprise a tubular member 39, upon the upper and lower ends of which are fitted and secured the encircling tubular members 42 and 43 respectively. This, in effect provides enlarged portions adjacent the top and bottom of the tubular member 39 and an intermediate reduced portion designated by numeral 44, without the necessity for expensive machining. The member 42 which is deeply grooved at 46 for a purpose to be described, extends upwardly above the top frame members 16 to 19, previously described, and is secured by means of the bracket 48 to a cross member 49 carried by the upstanding frame members 51 and 52 (Figs. 1 and 2). The lower end of the tube assembly 38 is provided with a rounded member 54 which has a smooth exterior surface to prevent scratching of the paper web 25 and to assist in guiding it. As shown in Fig. 14, the assembly 38 is secured at or adjacent its lower end to the frame member 34 by means of an angle shaped bracket 56 which has an upstanding leg extending within the tube 39 to which it is connected by screws 57 or other suitable means. The horizontal leg of the bracket 56 is connected to the frame member 34 by screws or other suitable fastening means 58.

Figure 6:
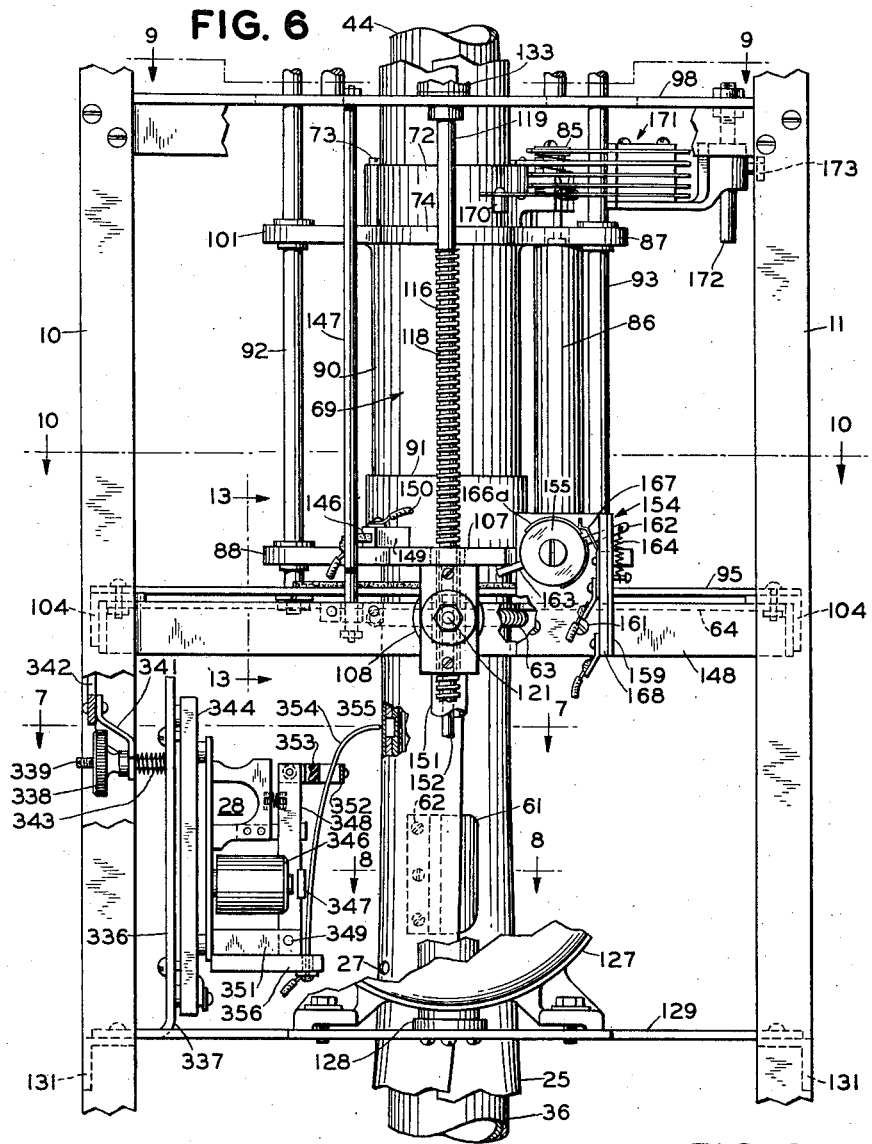
Fig. 6 is an enlarged view in elevation of a portion of the machine illustrated in Fig. 1, certain of the parts adjacent the top thereof being omitted for the sake of clearness.
Figure 7:
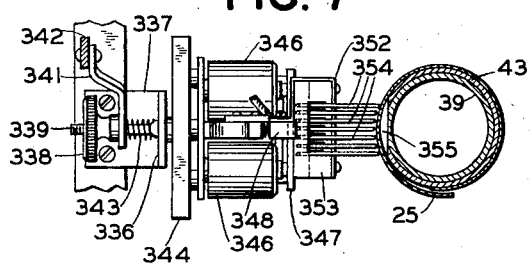
Fig. 7 is a fragmentary plan view taken in section on line 7—7 of Fig. 6.
Figure 8:
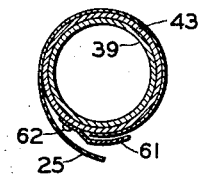
Fig. 8 is a fragmentary section on line 8—8 of Fig. 6 as viewed from above.

The edge of the web 25 which is transversely curved initially by the guide member 31 passes beneath a shoe 61 as illustrated in Fig. 8 of the drawings, the shoe being secured along one edge by the screws 62 or other suitable means to the tube 43. Above the shoe 61, the web 25 is held to the cylindrical form which it is compelled to take by the guide 31 and the shoe 61, by means of an elastic band 63 carried by a cross member 64 (Figs. 6 and 10).

The intermediate portion 44 of the tube assembly 38 is encircled by a freely slidable sleeve 65 which has an annular recess 66 provided with a friction ring 67 of rubber or other suitable material secured therein. Perforations 70 in the cylindrical portion 44 allow foreign matter to escape and thereby prevents binding of the sleeve 65. These perforations are preferably arranged so that they are staggered vertically. The sleeve 65 together with an encircling two part clutch or gripping device 68 mounted on a vertically movable carriage 69 (Fig. 6), seizes the web 25, bent to cylindrical form by the means heretofore described, and propels it upwardly when the machine is in operation. The above mentioned gripping device 68, details of which appear in Figs. 6, 9 and 12 of the drawings, comprises two similar arcuate members 71 and 72, each of which is pivotally carried on a pin 73. Both pins 73 are threaded into the top flange 74 of the carriage 69 and each arcuate member is provided with a friction member 76 of rubber or like material. The outer ends of the arcuate members 71 and 72 are joined by a tension spring 78 which serves to draw the arms together with sufficient force to seize the paper web 25 firmly between the friction members 76 and the friction ring 67.

Each of the arcuate members 71 and 72 is provided with a wedge-shaped shoe 79, as shown in Fig. 12 of the drawings, whereby they may be spread apart to release the paper web by means of a conical cam 82, the stem 83 of which is adjustably threaded into the slidable core 84 of a solenoid 86 secured to the carriage 69 between a projection 87 extending from the top flange 74 and a laterally projecting bottom flange 88, the latter appearing in plan in Fig. 10 of the drawings. The conical cam 82 is biased upwardly to its inoperative position by a compression spring 89 which rests on the shoes 79 and bears against a flange 85 secured to or formed on the upper part of the cam. The previously mentioned top flange 74 of the carriage 69 is formed on an elongated cylindrical portion 90 to the lower end of which is fitted a member having a cylindrical portion 91 bearing the above named laterally projecting bottom flange 88.

The carriage 69 is slidable bodily upon guide rods 92 and 93 which are adjustably fastened at their lower ends in elongated apertures 94 in a cross member 95, Fig. 10, and at their upper ends to a horizontal flange 96 (Fig. 4) projecting from a pedestal like member 97 which rests upon and is carried by a plate 98 forming the floor of a recording compartment 99. The upper portion of the carriage 69 is provided with an outstanding arm 101 (Fig. 6) similar to and angularly spaced from the arm 87 and these arms are apertured to receive the guide rods 92 and 93, respectively, and likewise the horizontal portion 88 of the cylindrical member 91 is apertured at spaced points to receive the guide rods, as shown in Fig. 10. The bar 95 is padded by a liner 103 of leather or any suitable yielding material so as to assist in cushioning the impact of the carriage 69 when it descends in operation of the machine. The apertures 94 provide for adjustment of the spacing of the bars 92 and 93 and the bar 95 is adjustably mounted on the frame members 104 by screws 105 engaging slots 106.

An extension 107 of the flange 88 (Figs. 10 and 13) at the lower end of the carriage, projects outwardly to provide a shelf beneath which is secured a solenoid 108 having a slidable centrally disposed core member 109. A block 112, provided with an arcuate threaded recess 114, is secured to the inner end of the core member 109. The threaded recess 114 in the block 112 cooperates with one or more threads 116, depending on the pitch thereof, on a shaft 118 to propel the carriage 69 upon rotation of the shaft. It will be noted that the outside diameter of the upper unthreaded portion 119 of the shaft 118 is the same as the diameter at the root of the thread 116 whereby the carriage 69 will cease its upward movement when the half nut 112 reaches the top of the thread. This serves to prevent possible damage to the machine if the control does not function in the expected manner. A compression spring 120 forces the block 112 outwardly so that the threads therein will be held firmly in meshing engagement with the threads 116. When the carriage 69 is allowed to return to the position illustrated in Fig. 6 following a scanning operation, and the solenoid 108 is de-energized in a manner to be described, the threads 116 may fail to engage the threaded recess 114 and the core 109 therefore will be in the position of Fig. 13 which is slightly to the right of the position it will assume when the threads are fully engaged. When the threaded parts are not fully engaged, a lug 121 on the core 109 projects into the path of a lug 122 formed on a switch operating member 123 to retain a suitable switch 124 (Fig. 15) within the housing 126 in its circuit closing position. The switch housing 126 is mounted on a convenient stationary part such as the housing of the motor 127 operatively connected to drive the shaft 118 through the combined bearing and gear assembly 128. When the shaft 118 is turned at reduced speed by the motor 127 in a manner to be described, the threads on the block 112 are forced into meshing engagement with the thread 116 by the spring 120 which permits the core 109 to move to the left of the position illustrated in Fig. 13. This movement of the core allows the lug 122 to be released and permits the switch operating member 123 to move the contacts of the switch 124 to circuit opening position.

The motor 127 which is used to drive the shaft 118 at speeds above and below normal in a manner to be described is secured to a shelf 129 carried by framing members 131 (Figs. 1 and 6). The upper end of said shaft is journaled in a member 133 secured to the horizontal partition 98. The top of the shaft 118 which extends above the member 133 carries a driven clutch member 134 (Fig. 3), the latter having pivoted driving cams 136 and 137 mounted thereon by means of pivot pins 138. The cams bear against the periphery of a driving clutch member 139 under the influence of relatively light springs 141. The driving clutch member 139 is driven through a suitable speed reducing device 142 from a constant speed motor 143 and it will be seen that when the motor 127 tends to rotate the shaft 118 at a speed greater than that which is imparted to it by the motor 143, the cams 136 and 137 act as a "free wheel" clutch. Likewise, when the motor 143 is at rest, the motor 127 can drive the shaft 118 at a slow speed to permit engagement of threads 114 and 116.

Operating current is fed to the carriage mounted solenoids 86 and 108 through a brush 146, in contact with a collector rod 147 (Fig. 6) carried at opposite ends by but insulated from the plate 98 and a cross member 148 supported from the transverse members 104. The brush 146 is mounted within a holder 149 which is connected by a conductor 150 (Figs. 6 and 15) to the operating coils of the solenoids 86 and 108.

A pneumatically cushioned buffer comprises a cylinder 151 (Figs. 1 and 10) secured to the cross member 148 and a piston 152 (Fig. 6) which projects upwardly toward the carriage 69 and cushions its descent. A spring within the cylinder 151 tends to force the piston 152 (Fig. 6) outwardly, but outward movement thereof is pneumatically retarded, so that when the carriage rises only a short distance before it is released, the piston does not follow the carriage but has an opportunity to rise only a short distance. This speeds operation inasmuch as the carriage can always descend freely for a time before it strikes the piston 152.

Several switches carried by the frame of the machine are designed to be operated by the movable carriage 69 at or adjacent its upper and lower limits of travel. A mechanically operated switch 154, comprising an insulating drum 155 composed of a series of five discs 156 carried by a sleeve 157, is journaled for rotation of a pin 158 which is threaded into one leg of an angle bracket 159. This angle bracket is secured by suitable means 161 to the previously mentioned cross member 148. The angular position of each disc on the sleeve 157 is adjustable for a purpose to be described. Rotation is imparted to the drum 155 by means of a switch operating crank member 162 secured to said drum and having a portion 163 projecting into the path of the horizontally extending shelf member 107 on the carriage. The opposite end of the switch operating member 162 is acted upon by a spring 164 so that the drum 155 is biased for rotation in a clockwise direction as viewed on Fig. 6 of the drawings. It will be seen therefore that as the carriage 69 descends, the drum switch will be rotated in a counter clockwise direction against the force of the spring 164.

The insulating drum 155 has a series of five contact segments 166a to 166e, one of which is secured to the surface of each disc and extends around approximately one-half of its circumference. These drum contacts cooperate with a series of contact fingers 167 secured upon an insulating block 168 which is fastened to the outstanding leg of the angle bracket 159. The purpose and function of the contact segments 166a to 166e and the contact fingers 167 will be explained in detail in connection with the description of the electrical features of the apparatus disclosed in Fig. 15 of the drawings.

As the carriage 69 travels upwardly, the outstanding shelf 107 engages the operating member 170 of a switch 171 shown near the top of Fig. 6, which is adjustably carried on a support 172 secured to the plate 98. A set screw 173 affords ready adjustment of the position of the switch. The switch 171 is of the double contact type and its purpose and function will also be explained in connection with a detailed description of the apparatus shown schematically on Fig. 15 of the drawings.

The recording stylus 176 is supported and operated in a manner now to be described. Within the recording compartment or cabinet 99 is mounted the previously mentioned hollow pedestal member 97 provided with outstanding feet 178 (Fig. 1) which are secured to the plate 98 by means of bolts or other fastening means 179. The previously mentioned flange member or plate 96 is secured to the member 97 by a suitable fastening screw 181 and it is braced rigidly in a horizontal direction by upstanding rods or anchor bars 183. The upper portion of the hollow pedestal member 97 is shown clearly in Fig. 5 from which it will be seen that a shoulder 189 is provided upon which is fitted a thrust bearing member 192 which provides a raceway for a plurality of ball bearings 193. A gear wheel 194 provided with a downwardly extending hub 196 is rotatably supported upon the bearing members 193 and is also journaled upon the upwardly extending portion of the pedestal member 97. The gear 194 is in mesh with a pinion 197 secured upon the rotor shaft of a driving motor 198. The motor 198 is of a type which runs at a substantially constant speed either under control of a sensitive governing device or the motor may be a synchronous motor fed from a frequency regulated source of alternating current. A flexible supporting arm 199 which carries the stylus 176, is secured in a slot in a post 200 which is secured to and projects upwardly from a plate 201, the latter being fastened by suitable means such as screws 202 to adjacent spokes of the gear wheel 194. The tension of the stylus 176 upon the paper web may be adjusted by means of a set screw and lock nut 203 carried by a bracket 204 projecting from the post 200. The paper web at this point of progress through the machine in cylindrical form is restrained from slipping downwardly by means of a plurality of small balls 205 (Fig. 5) positioned in a conical recess 206 in a ring 207 which is secured in the bore at the upper end of the member 97. In the event that there is a tendency for the paper web 25 to move downwardly, the balls 205 will be wedged between the paper web and the tapering wall of the recess 206. It is to be noted that a flexible strand of friction material such as rubber may be used to replace the group of balls 205. Downward slippage is also restrained by the friction lined shoe 208 which is pressed against the paper surrounding the tube 42 by a magnet 209 and withdrawn by a spring 210. The magnet and shoe are supported from the plate 96 by a bracket 213.

It is desirable at times to retract the stylus from contact with the paper web for reasons which will more fully appear as the description proceeds and to this end a magnet 211 is secured upon the plate 201 so as to attract the stylus and hold it from contact with the paper web. Recording current is supplied to the stylus by collector ring 212, and a second collector ring 214 supplies operating current to the magnet 211. These collector rings are fitted over a band of insulating material 216 which encircles the hub 196 of the gear. Brushes 217 and 218 carried in a brush holder 219 cooperate with the collector rings just described. The operating circuits which include these brushes and collector rings will be fully described hereinafter in connection with Fig. 15 of the drawings.

Following the completion of a scanning operation the paper web is accurately severed with respect to the headings 26 under control of the device 28 by cutting means now to be described in detail. Referring to Figs. 5 and 11 of the drawings, there is shown the previously mentioned groove 46 which is provided to cooperate with a cutter blade 221. A bracket 222 (Figs. 3 and 4) secured to a spoke of the gear 194 has an upstanding portion to which is secured a flat wide spring member 223, which in turn is secured to and partially supports a curved armature member 224 which carries the cutter blade 221 on angle-shaped bracket rods 226. A member 227 slotted at 288 is secured by a screw 229 to the upstanding leg of the previously described bracket 222. A threaded pin or rod 231 extends through the slot 288 and carries a check nut 232 whereby to adjustably limit the inward movement of the blade carrying armature 224. The armature 224 is drawn inwardly so as to press the cutter blade 221 into the groove 46 by means of a magnet 233 secured within the bore of the tube 39. The air gap which furnishes the magnetic flux is provided between the end 234 of the magnetic shell and the magnetic disc 236.

To insure against distortion of the web 25 when the cutter blade is operating thereon, a pressing device 237 composed of magnetic material is drawn against the paper web when the magnet 233 is energized. The pressing device 237 is mounted at the end of a stem 238 which reciprocates in an aperture formed in one flange of an angle member 239. A compression spring 241 serves to withdraw the device 237 from contact with the paper web 25 when the cutter magnet is deenergized.

A sheet which is severed from the web 25 by the cutter 221 is automatically removed by conveyor means now to be described. Referring again to Figs. 1 and 2 of the drawings, the upstanding frame member 51 has secured thereon a horizontal member 246 to the outer end of which is a link 248 pivoted at 247. Rocking movement is imparted to the link 248 by its pivotal connection with the reciprocating core 249 of a magnet 251. A rotatable shaft 252 is journaled at one end in the link 248 and at its other end is journaled in a hinge member 253. The shaft 252 has secured thereon a friction roller 254 of rubber or like material which is pressed against the paper sheet severed by the cutter 221 when the magnet 251 is energized. The top frame members 17 and 19 are provided with extensions 256 and 257 (Fig. 3) to the ends of which are secured frame members 258 and 259. A shaft 261 is journaled at each end in adjustably mounted members 262 which are in turn carried by the frame members 258 and 259. The shaft 261 is provided with a pulley 264 which drives a pulley 266 on the shaft 252 by a belt 267. The conveyor proper comprises a flexible belt 268 which passes over a driving pulley 269 driven from a motor 271. The belt 268 passes over idler pulleys 273, 274, 275 and 276. A flexible steel ribbon or band 279 is anchored at one end to the tubular member 42 and extends in contact with a belt 268 from a pulley 281 to a spring tensioned adjustable anchor at 283. The shaft which carries the pulley 281 and the shafts carrying the idler pulleys just described are adjustably mounted in a manner similar to that shown for the shaft 261.

As the sheet is severed from the web 25, the magnet 251 is energized in a manner to be described, which causes the friction roller 254 to raise the sheet and the sheet is straightened out as it is drawn upwardly by the roller 254 by means of a pair of wing-shaped guide members 285 which extend inwardly and are in contact at their tips with the cylinder member 42. Guide members 286 and 287 are provided for proper guiding of the sheet as it approaches the end of the steel band 279.

An electrically conducting metallic brush 288 is journaled at the end of shaft 289 and is pressed against the tube 42 by a spring mechanism in the post 290 in which the shaft 289 is pivoted so as to be swingable in a horizontal plane. The post 290 is secured to a cross member 192. The metallic brush makes contact with the tube 42 when a severed sheet is removed by the conveyor, to effect control of the apparatus in a manner to be described.

The previously mentioned recording compartment 99 is provided with side walls (not shown) preferably of a transparent material and also with a two-part cover 292 also of a transparent material. The parts of the cover are each provided with an arcuate recess to accommodate the upstanding tube assembly 38. In the event that a recording process is used which causes evolution of vapors or fumes, a suction blower 293 driven in any suitable manner may be placed in communication with the compartment 99 by a conduit 294, the intake of which is provided with a strainer 295. The compartment 99 may be supplied with conditioned air in the manner described and claimed in the copending Kline et al. application Ser. No. 143,392, filed May 18, 1937, now Patent No. 2,225,247, issued Dec. 17, 1940.

In Fig. 15 is shown a control arrangement of the invention governed in accordance with the length or some other characteristic of the subject matter which is transmitted over the line L from a more or less remote transmitter. In addition to providing for remote control of the machine by the length of transmitted subject matter, Fig. 15 also discloses the control means 28 and parts associated therewith which are operated by the web carried means 27 for insuring accurate register of the printed matter 26 and the scanned subject matter on the severed blanks. For the sake of convenience of illustration certain mechanical parts appearing in Figs. 1 to 10 are reproduced in diagrammatic form in Fig. 15. The control system is shown as being arranged for operation with transmitting apparatus of the kind disclosed in Fig. 3 of the copending Wise et al application Ser. No. 110,760, filed Nov. 13, 1936, now Patent No. 2,255,868, issued Sept. 16, 1941 and covered by claims asserted therein. It will be understood that the apparatus and circuits of Fig. 15 may be used equally well when the receiver is modified as disclosed by Figs. 16 and 17. Facsimile and control signals originating at the transmitter are received over the communication channel L by an amplifier RA of any suitable type. The output of the amplifier RA is fed by the conductors 300 to an amplifier or detector device 301 of a kind best suited for the method of recording which is employed. The dry method of recording disclosed in the copending application of R. J. Wise et al., Ser. No. 23,928, filed May 28, 1935, is preferably employed, in the manner shown in R. J. Wise application Ser. No. 84,935, filed June 12, 1936, now Patent No. 2,158,391, issued May 16, 1939. For recording by the preferred process just referred to, the output of the detector-amplifier 301 is fed to the recording stylus 176.

The end of message signal, originating at the transmitter, is an alternating current of substantially constant frequency. A tuner 302 is designed to select and pass the signalling frequency to a detector device 303. The output of this detector is connected to its supply source 306a through the operating coil of a relay 307. A relay 308, preferably of a type which is slow to release, receives energizing current from the source 306b and is controlled through the tongue 309 and the back contact 311 of the relay 307.

The apparatus including the relay 308 and the interconnecting circuits of Fig. 15 so far described are substantially the same as shown by Fig. 3 of Patent No. 2,255,868 previously mentioned and constitutes a preferred method of receiving phasing and control signals from a more or less remote transmitter; however, it will be understood that any other control arrangement may be employed to operate the tongue 312 of the relay 308 or an equivalent switching device. The relay tongue 312 is in communication with the current source 306b.

The drawing shows the tongue 312 of the relay 308 in contact with its back contact 314, a position which the relay tongue assumes when the signalling frequency is received over the line L. The contact 314 is connected to the previously described stylus lifting magnet 211 whereby the stylus 176 is kept out of contact with the recording surface during reception of the signalling frequency. In the modification disclosed by Figs. 16 and 17 of the drawings, a magnet 211', which replaces the magnet 211 of Figs. 1 to 15, is energized in the same way as the magnet 211 when the control signal is being received. The purpose and function of the magnet 211' will be explained in connection with the complete description of the modification of Figs. 16 and 17.

The back contact 314 of the relay 308 energizes a relay 318 which applies power from the source 306c over conductor 319 to the variable speed motor 127. The field 121 of this motor is connected directly to ground and the armature thereof is connected to the tongue 322 of the speed control relay 323 by way of the contact 324 to ground. The potentiometer 326 has one terminal connected to the conductor 319 and the remaining terminal thereof is grounded. The adjustable slider 327 is in communication with the front contact 328 of the relay 323. When the relay 318 is energized as just explained from the contact 314, the motor 127 is connected directly across the current source 306c and therefore operates at substantially full speed to raise the carriage 69 rapidly. It will be understood that this occurs when scanning has ceased and the end-of-message signal of constant frequency appears in the line L. Energization of the relay 318 in addition to supplying power to the motor 127 places the operating coil 329 of the relay 331 in communication with the current source 306c over the conductor 332. The circuit including the conductor 332 and the operating coil 329 is, however, interrupted at the front contact 333 of the relay 331 until the operating coil 334 of the said relay is energized in a manner now to be described.

Referring to Fig. 6 as well as Fig. 15, the device 28 which controls the register of the web severing blade 221 is mounted upon an upstanding bracket 336 which is designed to yield slightly at its point of connection 337 for purposes of adjustment. This adjustment is effected by means of a thumb nut 338 which engages a threaded post 339 secured to the bracket 336. The thumb nut reacts against a bracket 341 secured to a suitably positioned frame member or other stationary part 342. A compression spring 343 encircles the post 339 and bears against the brackets 336 and 341. The device 28, constructed if desired for reasons of convenience or economy from an ordinary telegraph sounder, is mounted on a base 344 and comprises an electromagnet 346 which is designed upon energization to attract an armature 347 carried upon a lever 348 pivoted at 349 to stationary member 351. A conducting member 352 carried by but insulated from the lever 348 by an appropriate insulating structure 353 is adapted to engage any one of a series of conducting springs 354 when one of these springs drops through one of the previously mentioned web apertures 27 and into the perforation or slot 355 in the tube 43. These springs are fixed in an insulating block 356 which is secured to the bracket 351.

One terminal of the magnet coil 346 of the device 28 is connected to the current source 306d by way of the normally closed contacts 166a of the drum switch 154. The remaining terminal of the magnet coil 346 is connected by way of a conductor 359 to the elongated contact springs 354. When the motor 127 draws the paper web upwardly until one or more of the springs 354 enters an aperture 27 in the web, contact is made with the contact piece 352 which causes energization of the magnet coil 346, from the source 306d by way of the contacts 166a. The armature 347 is immediately attracted, drawing the lever 348 to the left as viewed in Figs. 6 and 11, and withdraws the spring 354 from the apertures 27 and 355.

A relay 361 is energized at this time from the current source 306e by way of the conductor 362 and the grounded contact member 352. The grounded tongue 364 of the relay 361 engages one of its front contacts 366, the latter being connected to one terminal of the operating coil 334 of the relay 331 over a conductor 367. The tongue of the relay 331 energizes the locking coil 329 through the front contact 333. In addition to locking the relay 331 closed, the tongue thereof energizes the motor control relay 323 over the conductor 370. The function of the motor control relay will be described later. The remaining terminal of the relay coil 334 is connected to the conductor 332 to receive energy from the current source 306c by way of the contact tongue of the relay 318.

The second contact 368 of the relay 361 energizes the operating coil 369 of a relay 371 by way of conductors 372 and 373, the conductor 373 being in communication with the current source 306b by way of the normally closed contacts 166b of the drum switch 154. The tongue 376 of the relay 371 is connected to a current source 306e and locks the relay through its contact 377 and locking coil 378 by way of the contacts 166c on the drum switch 154. The magnets 86, 108, 223 and 209 are also energized from the source 306e over conductor 382.

When the carriage is at or near the end of its downward stroke, the normally closed contacts 166a, 166b and 166c of the drum switch are opened, and the normally open contact 166d thereof is closed. The projection 121 on the core 109 of the half nut operating solenoid 108 projects outwardly into the path of the switch operator 122 and closes this switch to maintain energization of the relay 318 which otherwise would be interrupted at this time by the opening of contact 166b. The motor control relay 323, when energized in the manner previously described from the contact 333, transfers the armature of the motor 127 via the tongue 322 and the contact 328 to the slide contact 327 of the potentiometer 326. This reduces the voltage across the armature of the motor 127, causing it to run at greatly reduced speed for the purpose of permitting the half nut 112 to engage the threads on the shaft 118. When meshing engagement occurs, the core 109 moves to the left, as viewed in Fig. 13 of the drawings, and permits the contacts of the switch 124 to open deenergizing the relay 318 at this time. When relay 318 is deenergized, relays 331 and 323 are deenergized, it being remembered that these relays receive their energization from current source 306c and the contact tongue of the relay 318.

The closing of the contacts 166d after release of the carriage energizes the coil 389 of the conveyor control relay 391, this coil receiving its energization over the conductor 332 from the source 306c. The relay 391 through its tongue 392 and front contact energizes the belt conveyor solenoid 251 from the source 306f which removes the previously severed portion of the web 25. The relay 391 is locked by means of the locking coil 393 which is energized from the relay tongue 394.

When the severed portion of the web is removed by the conveyor, brush 288 contacts the grounded tube 42 and deenergizes the coil 393 by short circuiting it and as the relay 318 which supplied the power to energize the coil 389 of the relay 391 is opened, as explained, the belt conveyor solenoid 25 is released.

When reception of the signalling frequency ceases, the relay 307 releases its armature 399 which results in energization of relay 308 so that its tongue 312 is attracted to contact with its front contact 396 which energizes a relay 397. The relay 397 controls the supply of current to the scanning motor 143. The normally closed switch 171 is included in the circuit of the operating coil of the relay 397 so that in case the paper feed carriage reaches the top of its stroke without an end-of-message signal being received from the transmitter, the motor 143 will be stopped since the upward motion of the carriage opens contacts 399 and 401. Emergency operation of the switch 171 to energize the relay 361 has been explained above. The switch 171 also includes the pair of additional normally open contacts 402 and 403 which close the circuit from the current source 306g to a warning signal 406 if the carriage overtravels.

Separate batteries 306a to 306g have been shown for simplicity of illustration but it is to be understood that a common battery or other suitable source of current may be employed.

Assuming that a constant frequency signal is being received and that the movable carriage of the receiver is in its lower position awaiting incoming facsimile signals, the operation of the apparatus and the control arrangement will now be described.

The contacts 166b, 166c and 166a of the drum switch 154 are held open mechanically by the carriage 69. The half nut member 112 is fully engaged with the threads 116 on the rod 118 which is stationary at this time by reason of the deenergization of the relay 308, which interrupts the circuit to the coil of the motor control relay 397. The recording stylus 176 is raised from the recording surface since the magnet 211 is energized from the relay contact 314. When facsimile signals are received over the line L, the control frequency ceases and the relay 307 is deenergized which causes energization of the relay 308. This energizes the motor relay 397 which causes the motor 143 to rotate the threaded shaft 118, and deenergizes the stylus lifting magnet 211 allowing the stylus to come in contact with the recording surface. The stylus rotates in contact with the recording surface and is advanced axially by the screw threads 116 until the constant frequency tone is again received from the transmitter. As the carriage begins its upward movement, the drum switch 154 is permitted to rotate, which closes its contacts 166a, b and c and opens the contact 166d. The beginning of the constant frequency tone serves as the end-of-message signal and to conserve operating time, the carriage 69 is raised rapidly by the motor 127 which is started upon energization of the relay 318 from the relay contact 314. The carriage continues to run at high speed until one of the tines or springs 354 of the device 28 enters an opening 27 in the web 25. When this occurs the coils 346 of the device 28 are immediately energized by reason of the ground applied to the tine 354 coming in contact with the conducting member 352, and all of the tines are pulled free of the recording web 25 and are retained in this position so long as the contact 166a remains closed. The relay 361 is energized at this time from the grounded conducting piece 352 by way of the conductor 362. When the tongue 364 of relay 361 pulls up, coil 369 of relay 371 is energized by way of the contact 368 and the tongue 376 thereof energizes the split nut release magnet 108, the clutch release magnet 86, the paper holding magnet 209 and the cutter magnet 233. The relay 371 is locked by its locking coil 378 by way of the carriage operated contacts 166c which are closed at this time. The operation of the split nut release magnet 108 and the paper gripping magnet 86 allows the paper feed carriage to fall to the bottom of its stroke. The cutter magnet 233 pulls the rotating knife against the web 25 and cuts off the portion thereof bearing the recorded message or other subject matter.

Energization of the relay 361, which occurred in the manner described upon operation of the device 28, also energizes the coil 334 of the relay 331 which in turn energizes the motor control speed relay 323 via the front contact 333 of the relay 331. Operation of the motor control relay 323 transfers the armature of the motor 127 via the tongue 322 and contact 328 to the slide contact 327 of the potentiometer 326. This reduces the voltage across the armature of the motor 127, causing it to run at a greatly reduced speed until the threads on the half nut 112 enter the threads 116 at which time opening of the switch 124 stops the motor. However, before this occurs and when the paper feed carriage 69 reaches the bottom of its stroke, it mechanically closes the switch 124 by engagement of the stop 121 with the projection 122, and opens contacts 166a, 166b and 166c of the drum switch 154 and closes contact 166d thereof. Switch 124 is controlled by the longitudinal position of the core 109 which carries the split nut 112 as explained previously and cannot open until this nut has engaged the thread 116 which feeds the paper carriage upwards. When the switch 124 opens, the relay 318 is deenergized which in turn releases the relays 331 and 323. Opening of the mechanically operated contact 166c releases the relay 371, and opening of the contact 166a releases the armature 347 of the device 28, and this in turn releases the relay 361. When the relay 371 is released, the magnets 86, 108, 209 and 233 are deenergized.

Upon closing, contact 166d energizes the belt conveyor solenoid relay 391, which through its tongue and contact energizes the belt conveyor solenoid 251 which removes the previously severed message. The relay 391 is locked by its locking coil 393. The brush contact 288 is insulated from ground while the message is being taken away, and is grounded as soon as the message passes a given predetermined point in the belt conveyor system. Grounding of the brush 288 deenergizes the coil 393 by short-circuiting it, and as the relay 318 which supplied power to energize the coil 389 of the relay 391 has by this time opened, the belt conveyor solenoid 251 is released.

This completes the cycle of operation, the feed carriage 69 being stationary at the bottom of its travel and the stylus remaining lifted from the recording surface until a start signal is again received to energize the control relay 308.

Figure 16:
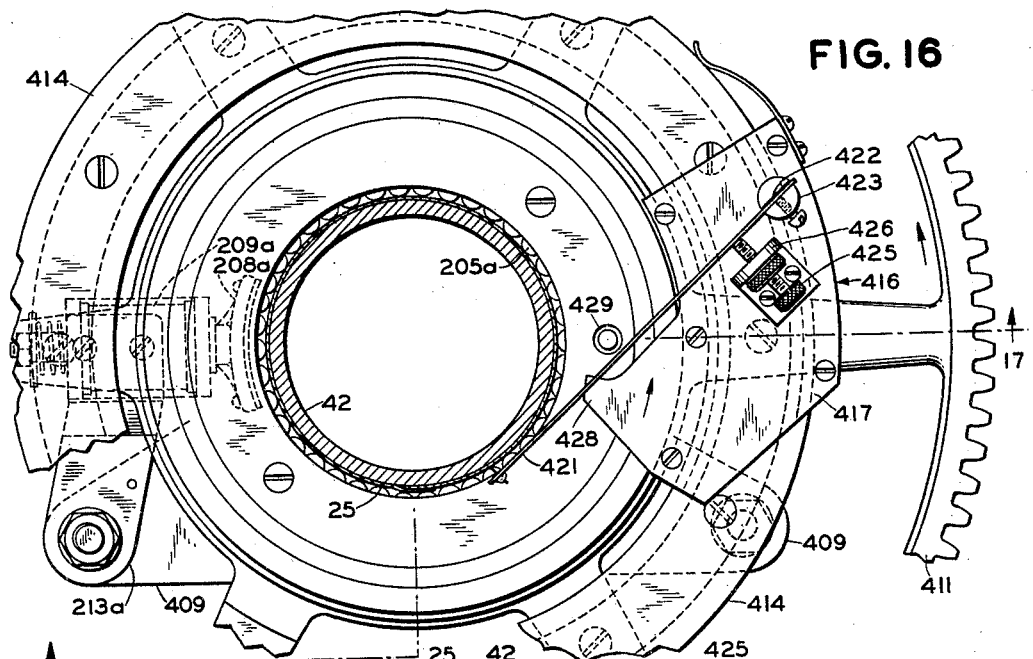
Fig. 16 is a fragmentary sectional view taken just beneath the top of the frame and illustrates a modified construction of certain of the parts of the machine of Figs. 1 and 2.
Figure 17:
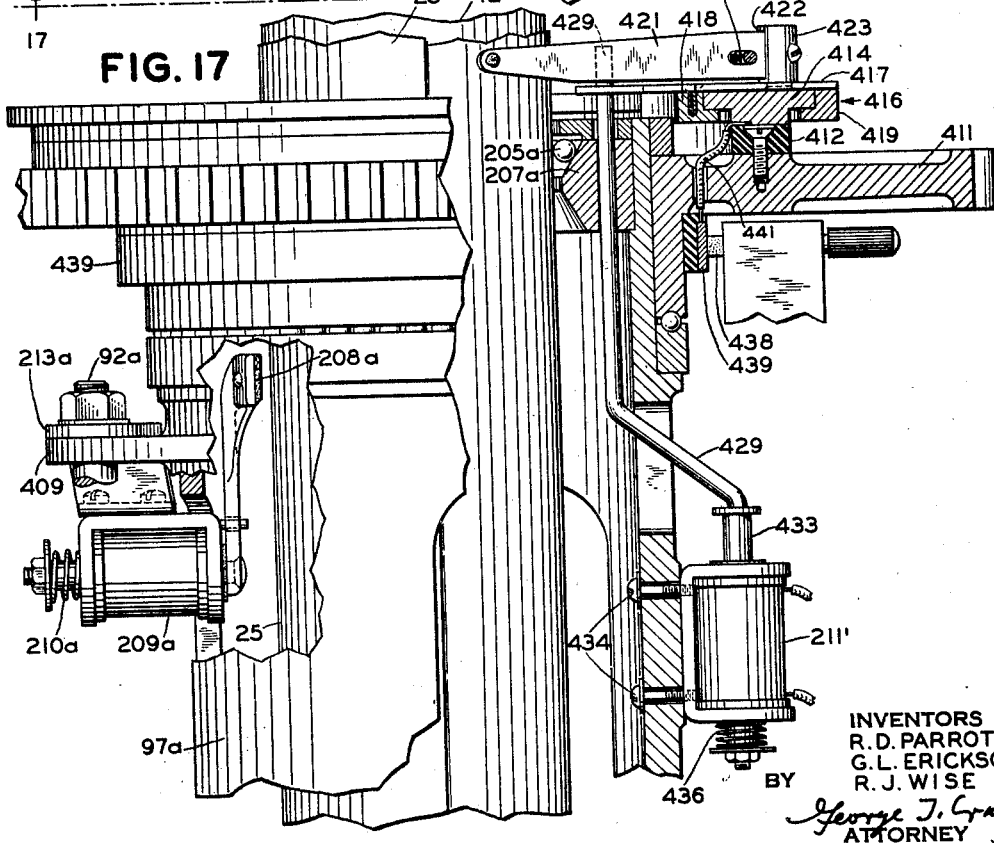
Fig. 17 is a fragmentary elevational view taken partly in section on line 17—17 of Fig. 16.

The modification of Figs. 16 and 17 provides means to effect the release of the recording stylus upon receipt of a signal from the transmitter whereby recording begins at the proper point on the blank encircling the tubular assembly 38. It will be understood, however, that in installations where the motor 198 shown in Figs. 1 to 15 is maintained in almost exact synchronism with the transmitter, it will be unnecessary to provide means for phasing the received copy. The major portion of the apparatus illustrated in Figs. 16 and 17 is similar to that already described in connection with Figs. 3 and 4 of the drawings and includes the pedestal member 97a which, however, has integral projections 409 in place of the separate plate 96 illustrated by Fig. 4. This improvement is one of detail only and does not materially affect the efficiency of operation of the apparatus. The guide rods 192a serve in the manner already described to guide the carriage. A gear 411 is rotatably journaled adjacent the top of the pedestal member 97a, and is provided with an insulating ring 412 to which is secured a conducting ring 414, T-shaped in cross section as shown in Fig. 17. A carriage 416 comprising a plate 417 and the inner and outer segments 418 and 419 carries the recording stylus 421 secured in the notch 422 formed in the post 423, the latter being secured to the plate 417. The stylus 421 is carried by a member of substantial length so as to be easily flexed and its pressure against the web 25 which encircles the tube 42 is adjustable by means of a thumb screw 425 threaded on a bracket 426, the latter being secured to the plate 417. From the parts thus far described, it will be seen that as the gear 411 rotates, the carriage 416 will be caused by friction to rotate therewith. To stop and hold the carriage at a definite point, the top plate 417 of the carriage is provided with a projection 428 adapted to engage a rod 429 slidably mounted in a ring 207a, the ring being secured in the end of the pedestal member 97a as shown. The top of the rod 429 projects upwardly so that it is also engaged by the stylus spring 421 causing the latter to be flexed and raised from contact with the recording sheet. The rod 429 at its lower end is secured in the core 433 of a solenoid 211', the latter being secured by the screws 434 to the pedestal member 97a. The solenoid 211' is designed so that when it is energized, its core 433 is raised against the pressure of the spring 436 which encircles the lower end of the core. Upon deenergization of the solenoid 211', a spring draws the core 433 and the rod 429 downwardly, releasing the carriage so that it will rotate with the gear 411, and at the same time releasing the stylus 421 so that it comes in contact with the recording surface. Recording currents are fed to the stylus 421 from a brush member 438 in contact with an insulated slip ring 439. A conductor 441 connects the insulated carriage track 414 to the slip ring 439.

Slipping of the paper web is resisted by the balls 205a seated in the recess formed in the ring 207a and by the shoe 208a operated by a magnet 209a which is similar in function to the magnet 209 shown on Fig. 4.

In operation of the modified apparatus just described, the solenoid 211' is energized and deenergized in precisely the same manner as the solenoid 211 shown in Fig. 15 of the drawings. It will, therefore, be seen that so long as signalling alternating current of given frequency is being received from the transmitter, the carriage 416 remains stationary and the stylus 421 will be maintained out of contact with the recording surface. At the instant transmission begins, the signalling frequency is cut off and the stylus makes contact with the recording surface at the proper point and rotates with the gear 411.

Fig. 18 discloses details of the electrical features of a modified control arrangement in preferred form suitable for use with the apparatus of Figs. 1 and 2 and also the slightly modified apparatus of Figs. 16 and 17 just described.

Referring to Fig. 18, the parts of the apparatus illustrated in Figs. 1 and 2 are given reference characters which correspond to those used in Fig. 15. The device 28 of Fig. 15 is replaced by a photo-sensitive device 500 which is illuminated by a lamp 501 or other suitable light source when a hole 27 in the web 25 passes in front of the photocell. A conventional amplifier 431 serves to interconnect the photocell with the relay 432 which controls energization of coil 504 of relay 505. Since the photocell is illuminated for but a brief period, a condenser 506 and resistor 507 connected in parallel with each other are interposed between the contact 508 of relay 432 and the relay coil 504. Power supply for energizing the relay 505 is derived from the supply source 509. The relay 505 is provided with a locking coil 510 which is energized by way of the grounded relay tongue 442.

From the description immediately foregoing it will be seen that when the photocell 500 is briefly illuminated, relay coil 504 will be momentarily energized which will cause the relay 505 to be locked upon grounding of its locking coil 510 by way of the grounded relay tongue 442. When this occurs, ground is applied to the operating coils of relays 443 and 444, which are in communication with the power source 509. Relay 443 controls energization of the cutter magnet 233 and the paper holding magnets 209, 209' the energizing circuit of which can be traced from ground through these magnet coils in parallel and by way of the conductor 446 to the source 509. Relay 444 controls energization of the split nut magnet 108 and the paper clutch magnet 86.

The operation of the scanning motor 143 is controlled by a relay 447 which is energized when the relay 307 is released in the manner disclosed in connection with Fig. 15 of the drawings. A second relay 448 is connected in parallel with the relay 447 so as to be simultaneously energized. When the relay 447 is deenergized, its tongue 449 falls back and bridges contacts 451 which starts the high speed paper feed motor 127 provided that the relay 444 is deenergized. Therefore, it will be seen that when the scanning operation is completed and tone signals received from the remote transmitting station, the relay 307 is energized which deenergizes the relay 447 whereupon the paper web 25 is driven upwardly at a higher rate of speed until the photocell 500 is illuminated by the lamp 501. When the relay 448 is deenergized, its tongue bridges the back contacts 452 which energizes the stylus lifting magnet 211 and the lamp 501.

The conveyor magnet 251 is controlled by relays 453 and 454. The purpose and function of these two relays will be described more in detail in the following description of the operation of the control arrangement of Fig. 18.

To start the machine after a period of idleness, the switches marked a to g are closed. The switches b to f are interconnected for operation with the doors of the machine for safety. The motors 293, 271 and 201 will operate.

At the beginning of operation, switches 456, 457, 463 and 458 are opened and the switch 459 is closed. The switches just named correspond in function to the contacts 166a—166d of the drum switch 154 and may in fact be constructed in the same manner. When reception of the telegraph signal ceases, the relay 307 is released which grounds the coils of relays 447 and 448. The relay 447 starts the motor 143 and the relay 448 breaks the circuit of the stylus magnet 211, allowing the stylus to drop upon the paper and record any signal that may be sent. As the carriage moves upwardly, the switches 456, 457 and 458 are closed and the switch 459 is opened, and the paper moves upwardly beneath the metallic brush 288.

When the facsimile signals cease and the signalling tone is applied from the remote transmitter, the relay 307 attracts its armature, thus releasing the tongues of relays 447 and 448. Relay 447 stops the low speed motor 143 and starts the high speed paper feed motor 127. The relay 448 lifts the stylus from the paper and lights the photocell exciting lamp 501.

The paper continues to be fed upwardly at a relatively high speed until one of the spaced perforations in the web 25 is opposite the photocell 500 whereupon the photocell closes the relay 432 for a brief time, causing a pulse of current to flow in the coil 594 of the relay 505. This causes the relay 505 to be locked through its locking coil 510. The grounded relay tongue also grounds the coils of the relays 444 and 504. The relay 444 stops the high speed motor 127, energizes the split nut magnet and energizes the paper clutch magnet 86. The relay 443 operates the paper holding magnets 209 and 209' and the paper cutting magnet 233. The holding magnet 209', it will be understood, is preferably positioned above the stylus. In the event that the photocell control does not function in the expected manner, continued upward movement of the carriage will close a switch 463 corresponding to the switch 131 of Fig. 15.

As the carriage drops back, the switches 456, 457 and 458 are opened and the switch 459 is closed, while the brush 288 is maintained out of contact with the tubular member by means of the paper web. When the switch 459 closes, it operates the relay 454 which in turn operates the relay 453, the latter energizing the conveyor magnet 251. The conveyor moves the severed message from beneath the brush 288, thus grounding both sides of the coil of the relay 454 and causing it to drop back and open the circuit through the relay 453 to release the conveyor magnet. The machine is thus returned to its original position in readiness for a scanning operation.

From the foregoing complete description of the illustrative embodiments and their operation, it will be seen that a novel automatic facsimile telegraph receiver of high frequency is provided by the present invention.

While the invention has been explained and described in detail in connection with two illustrative embodiments thereof, it is to be understood that the invention may be embodied in other forms and therefore the invention is not limited except as indicated by the terms and scope of the appended claims.

We claim:

1. In a facsimile machine, the combination of a flexible strip, a recorder for marking said strip, means to advance said strip for cooperation with said recorder, means to sever portions of said strip, means spaced at appropriate intervals along said strip for causing operation of said severing means, and mechanism for coordinating and timing the operation of said recorder, said strip advancing means and said severing means.

2. In a facsimile machine for recording on a strip, rotary recording means, means to curve and advance a recording strip for cooperation with said recording means, and rotary means to sever successive portions of the strip bearing recorded subject matter, said advancing means being operative, subsequent to a severing operation, to advance said strip for reception of a subsequent recording from said recording means.

3. An automatic facsimile telegraph machine comprising, in combination, means for guiding a record strip through said machine, a facsimile scanning device for scanning said strip, means operating in time relation with said scanning device for advancing said record strip through said machine in such manner that predetermined portions respectively of the strip are subjected successively to scanning operations by said scanning device in regard to succeeding messages, and means controlled by said strip and operating in time relation with said scanning device and effective subsequent to the completion of a scanning operation in regard to a message for severing the scanned portion of said strip bearing said message.

4. In a facsimile machine comprising marking means; in combination, a recording strip, means for transversely curving said strip into cylindrical form, and reciprocable means surrounding said curved strip for intermittently engaging said strip to propel the same for cooperation with said marking means.

5. In a facsimiles machine, including recording means, a record strip, means for transversely curving said record strip into cylindrical form, means comprising a reciprocable device surrounding said curved strip for feeding said strip during movement in one direction, and means for holding said strip stationary while said device moves in the opposite direction.

6. In a facsimile machine, a recorder comprising a revolvable recording stylus, a stationary cylinder about which said stylus revolves, means for transversely curving a record strip to cylindrical form to surround said cylinder, means movable longitudinally relative to said cylinder to advance said record strip along said cylinder at a constant rate during a recording operation, and means to return said advancing means to its initial position whereby to be effective to advance the strip for the next successive recording.

7. In a facsimile machine comprising a scanner for producing records of received signals; in combination, a recording strip, means including a cylindrical member for transversely curving said strip into cylindrical form to surround said member, and reciprocable means surrounding said cylindrical member and said curved strip for intermittently engaging said strip to propel the same for cooperation with said scanner.

8. In a facsimile machine comprising a scanner for producing records of received signals; in combination, a record strip, means including a cylindrical member for transversely curving said strip into cylindrical form to surround said member, reciprocable means surrounding said cylindrical member and said strip for intermittently engaging said strip to propel the same for cooperation with said scanner, and means to sever portions of said strip bearing subject matter recorded thereon.

9. In a facsimile machine comprising a record strip, means to curve said strip longitudinally to cylindrical form, a reciprocating carriage, means on said carriage designed to surround and engage said strip during movement of said carriage in one direction, and means operable to release said strip engaging means upon reversal of carriage movement.

10. An automatic facsimile telegraph machine comprising, in combination, means for guiding a record strip through the machine, a facsimile scanning device and means for causing said device to travel in a curvilineal path to scan said strip, means operating in time relation with said scanning means for advancing the record strip through said machine in such manner that predetermined portions respectively of the strip are subjected successively to scanning operations by said scanning device in regard to succeeding messages, means for curving said strip to a curvilineal configuration substantially corresponding to the curvilineal path of said scanning device during scanning operations, and a plurality of means operating in time relation with said scanning device and effective subsequent to the completion of a scanning operation in regard to a massage for automatically severing the scanned portion of said strip bearing said message and for restoring said severed portion to a substantially flat shape.

11. In an automatic facsimile machine for marking a record strip, a recorder comprising a revolvable recording stylus, a cylinder about which said stylus revolves during a scanning operation, means for transversely curving the record strip to cylindrical form to surround said cylinder, means operating in time relation with said recording stylus and movable longitudinally relative to said cylinder for effecting relative movement between said stylus and the record strip surrounding said cylinder to cause a scanning operation to proceed at a predetermined constant rate longitudinally along the strip on said cylinder during a recording operation, and means operating upon the termination of a recording operation for advancing the strip through the machine for a subsequent recording operation.

12. In an automatic facsimile machine for marking a record strip, a recorder comprising a revolvable recording stylus, a cylinder about which said stylus revolves during a scanning operation, means for transversely curving the record strip to cylindrical form to surround said cylinder, means operating in time relation with said recording stylus and movable longitudinally relative to said cylinder for effecting relative movement between said stylus and the record strip surrounding said cylinder to cause a scanning operation to proceed at a predetermined constant rate longitudinally along the strip on said cylinder during a recording operation, and means operating upon the termination of a recording operation for advancing the strip in cylindrical form through the machine at a higher rate than said predetermined scanning rate until the strip is in position for a subsequent recording operation.

13. In a facsimile machine, an elongated stationary member, a sleeve member slidable upon said elongated member and biased for movement in one direction, an axially movable record strip encircling said member and said sleeve, gripping means designed for holding said strip in conjunction with said sleeve, means to move said gripping means in at least one direction and means to cause the same to release said strip.

14. In a telegraph receiver, a record strip and means for feeding said strip, means for marking said strip, means for causing operation of said feeding means at one speed during a marking operation and at a higher rate of speed when marking ceases, a strip severing device, and means on said strip to operate said severing means and said feeding means.

15. In a facsimile machine, in combination, a record strip, means to advance said record strip comprising a reciprocable carriage biased for movement in one direction, a releasable strip engaging means on said carriage, means for propelling said carriage, means operatively connected to said propelling means to advance said carriage at recording speed, means operatively connected to said propelling means to accelerate the movement of said carriage, and means to cause release of said propelling means whereby said carriage is permitted to move in the direction of its bias.

16. In a facsimile machine, in combination, a record strip, means to bend said record strip to cylindrical form, means to advance said record strip comprising a reciprocable carriage biased for movement in one direction, a releasable strip engaging means on said carriage, a lead screw for propelling said carriage, a substantially constant speed motor with a one way clutch interconnecting said motor with said lead screw and a second motor operatively connected to said lead screw by direct driving means whereby movement of said carriage may be accelerated during predetermined time intervals.

17. The combination of claim 13 wherein said carriage is provided with a member adapted to threadedly engage said lead screw, an electromagnet to withdraw said last named means from engagement with said lead screw, an electromagnet operatively connected to release said gripping means, and means operatively interconnecting said electromagnets for simultaneous operation.

18. In a facsimile machine, a recorder comprising a rotary member carrying a recording stylus, a relatively constant speed motor and means operatively connected to drive said rotary member from said motor, a stationary cylinder concentric with said member, means for transversely curving a record strip to cylindrical form to surround said cylinder, means movable longitudinally relative to said cylinder to advance said record strip at a constant rate in a longitudinal direction for cooperation with said stylus during a receiving operation and means to return said record strip advancing means to its initial position in preparation for a successive recording.

19. An automatic facsimile telegraph machine comprising, in combination, means for guiding a record strip through said machine, a facsimile scanning device for scanning said strip, means for causing relative movement between said scanning device and said strip longitudinally of the strip at a predetermined rate during a scanning operation to provide line feed for the scanning device, means operating in time relation with said scanning device and effective upon termination of a scanning operation in regard to a message for advancing said record strip a predetermined distance and at a higher rate than the said rate of line feed to substantially reduce the time required between successive messages, and means operating when the record strip has advanced said predetermined distance to automatically sever the portion of the strip which has just been scanned.

20. In a facsimile machine, capable of recording on a continuous blank and severing the same at intervals, in combination, a recording strip having a recurring pattern thereon, a device for controlling the localizing of the patterns on the strip with respect to a line of severance comprising a main driving means, a subtantially constant speed motor for normally driving said main driving means, a motor adjusted to operate at a faster speed, means comprising a one way clutch operatively connecting said first named motor to said main driving means, and means including a circuit making device controlled by the position of a predetermined point on the paper relative to the position of the cutting means to stop said second named motor and operate said cutting device.

21. A control system for a facsimile machine having intermittently operable paper advancing means, said system comprising a relay operable in response to signaling current from an associated transmitter, a motor control circuit including a high speed driving motor controlled by a switching means under control of said relay, a second motor control circuit including a low speed motor, said driving motor controlled by a switching means under control of said relay, a relay operated by local impulses derived from a record strip, and means responsive to operation of said second named relay for opening said first named motor circuit.

22. A control system for a facsimile machine comprising an intermittently operable paper advancing means and a blank severing means, said system comprising a relay operable in response to signaling current from an associated transmitter, a motor control circuit including a high speed driving motor controlled by a switching means under control of said relay, a second motor control circuit including a low speed motor, said driving motor controlled by a switching means under control of said relay, a relay operated by local impulses derived from a record strip, means responsive to operation of said second named relay for opening said first named motor circuit, and means under control of said second named relay to operate said severing means.

23. In a facsimile machine, an intermittently operable paper advancing device, mechanism for imparting movement to said device comprising a driving member and a driven member, the latter being connected to said device, means to move said driven member toward meshing engagement with said driving member, and means to insure movement of said driving member at less than normal speed until meshing engagement has been effected between said driving and driven members.

24. In a facsimile machine, a recorder, means to advance a recording strip for cooperation with said recording means, means to sever portions of said strip bearing recorded subject matter, a conveyor to deliver said severed portions at a convenient point externally of said machine, a feeder for said conveyor comprising a rotating member, means for bringing said rotating member to bear upon each successive severed portion to feed the same into said conveyor, and means for releasing said rotating means when a severed portion has passed to said conveyor.

25. In a facsimile machine, a record sheet, a movable member, a stylus and stylus supporting means frictionally carried by said movable member, a member interposed in the path of said stylus to withdraw it from said record sheet and to prevent movement thereof with said movable member, and means for withdrawing said last named member from the path of said stylus to permit movement thereof and engagement with the record sheet.

26. In a facsimile machine, recording means, means to advance a recording strip for cooperation with said recording means, means to bend said recording strip to cylindrical form to cooperate with said strip advancing means, means to sever portions of said strip bearing recorded subject matter, a conveyor to receive said severed portions and convey them to a convenient point externally of said machine, and means associated with said conveyor for restoring said severed portions to a substantially flat shape.

ROBERT D. PARROTT.
GEORGE L. ERICKSON.
RALEIGH J. WISE.